United States Patent

Korst et al.

[11] Patent Number: 6,138,221
[45] Date of Patent: Oct. 24, 2000

[54] METHOD AND SYSTEM FOR SUPPLYING STREAMS OF DATA HAVING IDENTICAL MAXIMUM CONSUMPTION RATE IN A STORAGE MEDIUM

[75] Inventors: Johannes H. M. Korst; Edzer Lawerman; Serverius P. P. Pronk; Giel Van Doren, all of Eindhoven, Netherlands

[73] Assignee: U.S. Philips Corporation, New York, N.Y.

[21] Appl. No.: 08/993,952

[22] Filed: Dec. 18, 1997

[30] Foreign Application Priority Data

Dec. 23, 1996 [EP] European Pat. Off. ............. 96203687

[51] Int. Cl.[7] .............................. G06F 12/00; H04N 7/10
[52] U.S. Cl. ............................... 711/167; 348/7; 711/169; 711/114; 711/112
[58] Field of Search ........................... 711/114, 111, 112, 711/167, 100, 169; 348/7

[56] References Cited

U.S. PATENT DOCUMENTS

| | | | |
|---|---|---|---|
| 4,485,402 | 11/1984 | Searby | 348/715 |
| 5,612,742 | 3/1997 | Krause et al. | 348/385 |
| 5,732,239 | 3/1998 | Tobagi et al. | 711/114 |
| 5,884,004 | 3/1999 | Sato et al. | 386/98 |
| 5,926,205 | 7/1999 | Krause et al. | 348/7 |
| 5,926,649 | 7/1999 | Ma et al. | 711/111 |
| 5,950,015 | 9/1999 | Korst et al. | 348/7 |
| 5,964,829 | 10/1999 | Ozden et al. | 709/102 |
| 6,018,359 | 1/2000 | Kermode et al. | 348/7 |

OTHER PUBLICATIONS

PHN 15,381, Serial No. 08/678,217.

*Primary Examiner*—John W. Cabeca
*Assistant Examiner*—Pierre-Michel Bataille
*Attorney, Agent, or Firm*—Daniel J. Piotrowski

[57] ABSTRACT

In a system 100, such as a video-on-demand-server, a reader 180 reads data from a storage medium 110 and stores the read data in buffers 125. The data is supplied from the buffers 125 to users 130 for consumption in the form of a plurality of data streams. The data streams may be fixed rate or variable rate with an identical maximum consumption rate of $R_{max}$ data elements per second. The reader 180 is controlled by a scheduler 170. The scheduler 170 divides a predetermined period of $t_{cycle}$ seconds, wherein for each active data stream at least $R_{max}*t_{cycle}$ data elements can be read from the storage medium, into n successive time intervals, each of $t_{interval}$ seconds. For each data stream a corresponding buffer 125 is reserved for storing at least $R_{max}*(n+1)*t_{interval}$ data elements. The data is read from the storage medium 110 by repeatedly sweeping the storage medium 110 for a group of data streams. Immediately before causing the reader 180 to perform a next sweep, the scheduler 170 determines the composition of the next group of data streams to be supplied with data. At least data streams whose corresponding buffer 125 comprise less then $R_{max}*2*t_{interval}$ data elements are assigned to this group.

21 Claims, 2 Drawing Sheets

METHOD AND SYSTEM FOR SUPPLYING STREAMS OF DATA HAVING IDENTICAL MAXIMUM CONSUMPTION RATE IN A STORAGE MEDIUM

BACKGROUND OF THE INVENTION

The invention relates to a method for scheduling reading data from a storage medium for consumption by users in the form of a plurality of data streams, wherein each of the data streams has an identical maximum consumption rate of $R_{max}$ data elements per second; said method comprising the steps of:

(i) dividing a predetermined period of $t_{cycle}$ seconds into n successive time intervals, each of $t_{interval}$ seconds;

(ii) reserving for each data stream a corresponding buffer capable of storing at least $R_{max}*(n+1)*t_{interval}$ data elements (iii) arranging the data streams in a plurality of distinct groups;

(iv) reading data for each data stream of a first one of said groups from the storage medium in one sweep and storing the data in the corresponding buffer.

The invention further relates to a system for reading data from a storage medium and supplying the data in the form of a plurality of data streams for consumption to users, wherein each of the data streams has an identical maximum consumption rate of $R_{max}$ data elements per second; said system comprising: a plurality of buffers for storing data; a reader for reading data from the storage medium and storing the read data in at least one of the buffers; and a scheduler for controlling the reader by:

(i) dividing a predetermined period of $t_{cycle}$ seconds into n successive time intervals, each of $t_{interval}$ seconds;

(ii) reserving for each data stream a corresponding buffer capable of storing at least $R_{max}*(n+1)*t_{interval}$ data elements (iii) arranging the data streams in a plurality of distinct groups; and (iv) causing the reader to read data for each data stream of a first one of said groups from the storage medium in one sweep and to store the data in the corresponding buffer.

A method and system of this kind are used in a multimedia server and, more specifically, in a video on demand server. A general requirement in such systems is to supply a continuous, un-interrupted stream of data to each active user. Typically data is read from a conventional storage medium, such as hard disks which are usually arranged in a disk array, such as a RAID system. To supply data to a user as a continuous data stream, special scheduling schemes for reading data from the disks are required with an appropriate scheme for temporarily buffering the read data before the data is supplied to the user. In general a distinction can be made between a fixed consumption rate and a variable consumption rate system.

In a fixed consumption rate system data is typically supplied to a user as a fixed rate data stream. Usually the rate is identical for each stream in the system. An example of such a system is a near-video-on-demand system, wherein a number of films can be played in parallel and the same film may be played several times in parallel, where regularly, for instance, every five or fifteen minutes, a new copy of the same film is started. A conventional scheduling algorithm for a fixed consumption rate system is the so-called SCAN algorithm. In this algorithm at fixed regular intervals for each stream a fixed amount of data (sufficient to last one period) is read and stored in the buffer. Typically, for each stream a buffer with capacity for storing two blocks is used; one for reading data from the disk and one for supplying data to the user(s). Reading from the disk occurs in one sweep (e.g. from the outer edge to the inner edge of the disk or vice versa) for all streams. Disk access is in the order in which the data for the streams happens to be located on the disk. Typically, the sweep and the buffer reading are synchronised: the buffers for all streams are read from the same buffer position and a new sweep is started at the moment when all read positions change from one block to the other (implying that in each buffer a block has become empty). The maximum duration of a sweep corresponds to the time required for the application to read a block from the buffer. No pre-conditions are made for storing the data on the disk, implying that a specific stream in one sweep may be serviced first and in a next sweep may be serviced last. As a consequence, a buffer of twice the block size is required.

In a variable consumption rate system the rate at which a user consumes data varies over time. Typically, a maximum consumption rate can be defined for each data stream. In practice, usually an identical maximum consumption rate is used for all streams, although it may be possible to efficiently support streams with different maximum consumption rates (e.g. one maximum for an audio stream and another maximum for a combined video and audio stream). Variable consumption rate systems are, for instance, used for systems which support VCR-like functions such as pause or slow motion, or systems which use a data compression scheme with a variable bit rate, such as MPEG-2. The SCAN algorithm can also be used for a variable consumption rate system with a defined maximum rate. Due to the variable rate, different streams may empty one of the buffer blocks at different moments. To be prepared for the worst case for each stream a buffer of three blocks is required (e.g. at the beginning of a sweep a stream had almost emptied a block (resulting in the stream being skipped for this sweep, since no entire block can be read); at the beginning of the next sweep, the stream has almost emptied two blocks (resulting in one block being loaded in this sweep); to cope with the situation that the stream may be serviced last during this sweep, a total of three blocks are required).

For fixed consumption rate systems, an improvement to the SCAN algorithm is known from "Design and Analysis of a Grouped Sweeping Scheme for Multimedia Storage Management" of P. S. Yu, M. Chen, D. D. Kandlur in Lecture Notes in Computer Science 712: Network and Operating System Support for Digital Audio and Video. According to the Grouped Sweeping Scheme (GSS) a total number of N data streams are divided in n groups. In one overall period of $t_{cycle}$ seconds a sweep is performed for each group, where the groups are serviced in a fixed order (cyclically servicing in a fixed sequence, usually referred to as Round Robin servicing). For each sweep a maximum duration of $t_{interval}$ sec. is reserved, where $m*t_{interval=tcycle}$. A stream is fixedly assigned to a group. Due to this fixed assignment, it is excluded that a stream is serviced first in one period and last in the following period. As such the buffer requirements are reduced from two large blocks to m+1 small blocks. Roughly speaking, the duration of the m sweeps corresponds to one large sweep in the SCAN system and n small blocks to one large block of the SCAN algorithm. Since in reality m small sweeps take longer than one large sweep, the actual savings in buffering are less. For each system an optimum number of groups can be calculated. Although in principle streams are fixedly assigned to groups, reallocation may occur in between cycles, for instance to achieve a better balance between the groups caused by streams leaving the system. To reallocate a stream some additional buffering and pre-fetching is required.

The fixed nature of the GSS system results in relatively long delays before new streams can be accepted by the system. The system is also not suited for handling variable consumption rate streams.

SUMMARY OF THE INVENTION

An object of the invention is to provide a method and system like the GSS scheme which offer increased flexibility, particularly, allowing shorter response times. It is a further object of the invention to offer a method and system like the GSS scheme which can be used for variable rate streams and particularly reduce the buffer requirements in a variable rate system. A further object is to provide a method and system which is more robust.

To achieve this object, the method according to the invention is characterised in that said method comprises repeatedly executing steps (iii) and (iv) in succession and for each repetition reassigning the data streams to the groups by in step (iii) assigning at least data streams whose corresponding buffer comprises less then $R_{max}*2*t_{interval}$ data elements to the first group. By immediately before each sweep forming the group of data streams to be swept next (i.e. to be serviced in the next sweep), the scheme is more flexible. By including in the next group the data streams which must be serviced in the next sweep or otherwise it cannot be guaranteed that the amount of the data in the corresponding buffers is sufficient to last two sweeps, no buffer underflow can occur. If in a fixed consumption rate system room is still available for accepting a new stream, rebalancing (if required) can take place immediately after a group has been serviced. This can reduce the response time of the system. This is even more important for certain variable consumption rate systems where frequently new streams emerge. An example of such a system is a system which offers VCR-like functionality, such as fast forward and fast reverse scanning, by playing another film (i.e. a switch from one stream to another stream occurs). When the method is used for variable consumption rate streams with an identical maximum consumption rate, the buffering requirements can be as low as n+1 small blocks (where a small block of data is sufficient to last $t_{interval}$ sec. at maximum consumption rate). It should be noted that if the GSS scheme, where streams are fixedly allocated to groups and an entire block is read for each stream during a sweep of the corresponding group, were applied to a variable consumption rate system with the additional modification that a stream is skipped in a sweep if the buffer of the stream cannot store an entire additional block, this would have resulted in requiring 2n+1 block buffers for each data stream. Also the robustness of the method according to the invention is improved by breaking the synchronisation between retrieving data from the disk to the buffer and supplying data from the buffer to the user. This allows the method to be used in many situations where it is difficult or even impossible to fully maintain the synchronisation. In a fully synchronised system also the network from the server to a set-top box at the user and the display of the data to the user needs to be fully synchronised. In practice this is difficult to achieve.

A variable consumption rate system is known from "Storage subsystem design in a large multimedia server for high-speed network environments" of J. K. Dey, C Shih, M. Kumar in Spie Proceedings, Vol. 2188, Pages 200–211, 1994. In this system, blocks are read from disk in fixed size, where the disk block size is chosen to correspond to one track. The disks, which are arranged in a RAID system, have a 256 KB cache, subdivided into eight 64 KB partitions. The disks are capable of queuing up to eight commands and execute the commands in such an order that the seek time is minimised. The scheduler selects for each sweep up to eight streams based on an Earliest Deadline First (EDF) criterion. The deadline of a block is the time by which the first data from the block has to be transferred via a network to a consumer. New streams are accepted using the following form of admission control. Time intervals corresponding to the transfer of eight disk tracks are taken as a unit. In principle the next and all future time intervals are checked based on all active streams and a new stream to see if at some moment in time a disk needs to be accessed more than eight times during a time unit. If so, the new stream is not accepted. The admission control in this algorithm is tedious. This is partly caused by the system not having a defined maximum consumption rate per stream, making it difficult to determine whether for the entire duration of a new stream capacity is available. Moreover, the system is static, i.e. a stream is accepted based on that the stream can be supported for the entire duration of the stream in parallel with other existing streams, implying that operation influencing this, such as VCR-like functions, are not simply possible.

A further embodiment of the method according to the invention is characterised in that step (iii) comprises the steps of:

arranging the data streams in at most n preliminary groups $g_1$ to $g_n$, where $g_1$, corresponds to the first group, by determining for each data stream a minimum number i=1 to n such that the buffer corresponding to the data stream comprises less then $R_{max}*(i+1)*t_{interval}$ data elements and assigning the data stream to group $g_i$; and reassigning the data streams to the preliminary groups by successively checking the preliminary groups $g_n$ to $g_2$ by: verifying whether the data for all data streams of group $g_i$ (i=n to 2) can be read within $t_{interval}$ seconds; if not: repeatedly selecting a data stream of group $g_i$ and removing the selected data stream from group $g_i$ until the data for all remaining data streams of group $g_i$ can be read within $t_{interval}$ seconds; and assigning the selected data streams to an earlier group $g_j$ (=1 to i--1).

Before starting a sweep, streams are preliminary assigned to groups by for each stream determining within which group, i.e. time interval, the stream needs to be serviced at the latest. This avoids underflow of a buffer. Furthermore, the preliminary assignment favours streams with least data left (earliest deadline) which on average results in a higher filling degree of the buffers. This in turn gives additional freedom in delaying servicing existing streams and allowing entry to new streams. To avoid that in a variable rate system, where streams may consume data at a rate below the maximum rate, too many streams are preliminary assigned to one of the last groups (i.e. the streams of such a group can not all be serviced within $t_{interval}$ sec.), streams are brought forward (i.e. are scheduled to be serviced earlier). The assignment scheme results in free capacity being immediately available (i.e. at the first group which is not fully filled and without running the risk of buffer underflow of any of the streams). This gives full flexibility in deciding how to use the free space.

A further embodiment of the method according to the invention is characterised in that a data stream is in one of a plurality of states including at least an active and a halted state, where for an active data stream a user may consume data and for a halted data stream a user may currently not consume data; and in that the method comprises, if in addition to servicing the data streams of the first group in the next sweep sufficient capacity is left for servicing at least one more data stream within an overall sweep duration of at maximum $t_{interval}$ seconds:

selecting a halted data stream for which a re-start signal has been received; and assigning the selected data stream to the first group.

In this embodiment, advantageously, free space is used for allowing halted streams to be reactivated at the earliest moment, reducing response times for halted streams.

A further embodiment of the method according to the invention is characterised in that a data stream is in one of a plurality of states including at least an active and a halted state, where for an active data stream a user may consume data and for a halted data stream a user may currently not consume data; and in that the method comprises, if a predetermined maximum number of data streams which can be serviced has not yet been reached and a request for including a new data stream has been received and in addition to servicing the data streams of the first group in the next sweep sufficient capacity is left for servicing at least one more data stream within an overall sweep duration of at maximum $t_{interval}$ seconds:

selecting a new data stream for which an inclusion request has been received; and assigning the selected data stream to the first group.

In this embodiment, advantageously, free space is used for allowing new streams to be serviced at the earliest moment, reducing response times for new streams.

A further embodiment of the method according to the invention is characterised in that the method comprises starting a new repetition of steps (iii) and (iv) immediately after completing step (iv) of a previous repetition. According to the known GSS scheme, a sweep may at maximum take $t_{interval}$ sec. and a successive sweep is started at $t_{interval}$ sec. after the previous sweep was started, even if the previous sweep was completed earlier. According to the invention, a next sweep may be started immediately after the preceding sweep has completed. In this way no time is wasted and lower response times can be achieved. A sweep may take less than the maximum allowed $t_{interval}$ sec., for instance, if the maximum number of streams are not present in the group, the streams did not require the maximum amount of data (typical for a variable rate system), the actual disk times (seek time and rotational latency) were less than the calculated worst case, or the actual disk transfer rate was higher than the worst case situation.

A further embodiment of the method according to the invention is characterised in that step (iv) comprises determining for a data stream of the first group an amount of free data elements in the buffer corresponding to the data stream and reading up to said amount of free data elements from the storage medium. By reading data from the storage medium in a variable block size, it is possible to use small buffers of only n+1 small blocks (where a block of data is sufficient to last $t_{interval}$ sec. at maximum consumption rate). It should be noted, that reading variable size data from a storage medium such as a hard disk favours a scheme for storing data on the medium as contiguous files, to avoid that for reading a block the disk needs to be accessed twice. Also a storage scheme may be used where files are stored as clusters (where the clusters are logically linked and may physically be stored in a 'random' sequence on the medium), and where clusters which logically follow each other partly comprise the same data (i.e. part of the data at the end of a cluster is duplicated at the start of a following cluster). The cluster overlapping is described in patent application PHN 15381 of the same applicant.

A further embodiment of the method according to the invention is characterised in that said step of selecting a data stream of group $g_i$ comprises selecting a data stream with least data left in the buffer corresponding to the data stream. In this way, the average filling degree of the buffers will be higher, giving additional freedom.

A further embodiment of the method according to the invention, wherein during each sweep for each data stream of the first group data is read from the storage medium in a predetermined block size, which substantially corresponds to $R_{max}*t_{cycle}$ data elements, is characterised in that the step of verifying whether the data for all data streams of group $g_i$ (i=n to 2) can be read within $t_{interval}$ seconds comprises determining the number of data streams assigned to the preliminary group $g_i$ and deciding that the data for all data streams of group $g_i$ can be read if less than or equal to k data streams have been assigned to the preliminary group $g_i$, where k corresponds to the maximum number of data streams for which it is guaranteed that within $t_{interval}$ seconds an amount of data elements can be read from the storage medium to last $t_{cycle}$ seconds of consumption at the maximum consumption rate $R_{max}$. When data is read from the medium in a fixed block size, this is a simple criterion for determining whether a preliminary group comprises too many streams or not.

A further embodiment of the method according to the invention is characterised in that step (ii) comprises for i=1 to n: selecting a maximum of k data streams from the plurality of data streams and allocating to each selected data stream a corresponding buffer capable of storing at least $R_{max}*(n+i+1)*t_{interval}$ data elements. In this embodiment where fixed size blocks are read from the storage medium, on average a buffer capable of storing 1½n+1½ small blocks is required for a stream which is considerably less than 2n+1 small blocks, which otherwise would have been required in a situation where fixed sized blocks are read. Note that a fixed sized block corresponds to n small blocks.

A further embodiment of the method according to the invention is characterised in that step (ii) comprises: reserving a buffer pool for storing at least $K*R_{max}*t_{cycle}$ data elements, where K corresponds to the maximum number of data streams for which it is guaranteed that within $t_{cycle}$ an amount of data elements can be read from the storage medium to last $t_{cycle}$ seconds of consumption at the maximum consumption rate $R_{max}$; fixedly allocating to each of the data streams a buffer for storing at least $R_{max}*2*t_{interval}$ data elements; and dynamically allocating to each of the data streams of the first group a portion of the buffer pool for storing at least $R_{max}*n*t_{interval}$ data elements. This reduces the buffer requirements to n+2 small blocks per stream in a situation where fixed sized blocks are read.

A further embodiment of the method according to the invention is characterised in that the method comprises selecting at least one data stream which is not a member of the first group and de-allocating at least a part of the portion of the buffer allocated to the selected data stream, if the buffer pool does not comprise sufficient unallocated storage space required for allocation to the data streams of the first group. A situation can occur that many streams use more than n+1 small blocks, particularly if those streams are not consuming data at the maximum rate, resulting in not sufficient space being left in the buffer pool for allocation to streams which need to be serviced next. In such a situation, part of the buffer pool is de-allocated from streams which do not need to be serviced during the next sweep.

A further embodiment of the method according to the invention is characterised in that selecting a data stream for de-allocation comprises selecting a data stream which has most data stored in the allocated portion of the buffer pool. In this way, the average filling degree of the buffers for the streams will be higher, giving additional freedom.

A further embodiment of the method according to the invention is characterised in that the de-allocation occurs in units of at least $R_{max}*t_{cycle}$ data elements. Particularly for systems where data is read from the storage medium in fixed size blocks, it is preferred to de-allocate the same size blocks, avoiding that two or more disk accesses are required for the next time reading an entire block.

To achieve the object of the invention, the system according to the invention is characterised in that the scheduler is conceived to repeatedly execute steps (iii) and (iv) in succession and for each repetition reassigning the data streams to the groups by in step (iii) assigning at least data streams whose corresponding buffer comprises less then $R_{max}*2*t_{interval}$ data elements to the first group.

BRIEF DESCRIPTION OF THE DRAWING

These and other aspects of the invention will be apparent from and elucidated with reference to the embodiments shown in the drawings.

DETAILED DESCRIPTION OF THE INVENTION

Figure 1:
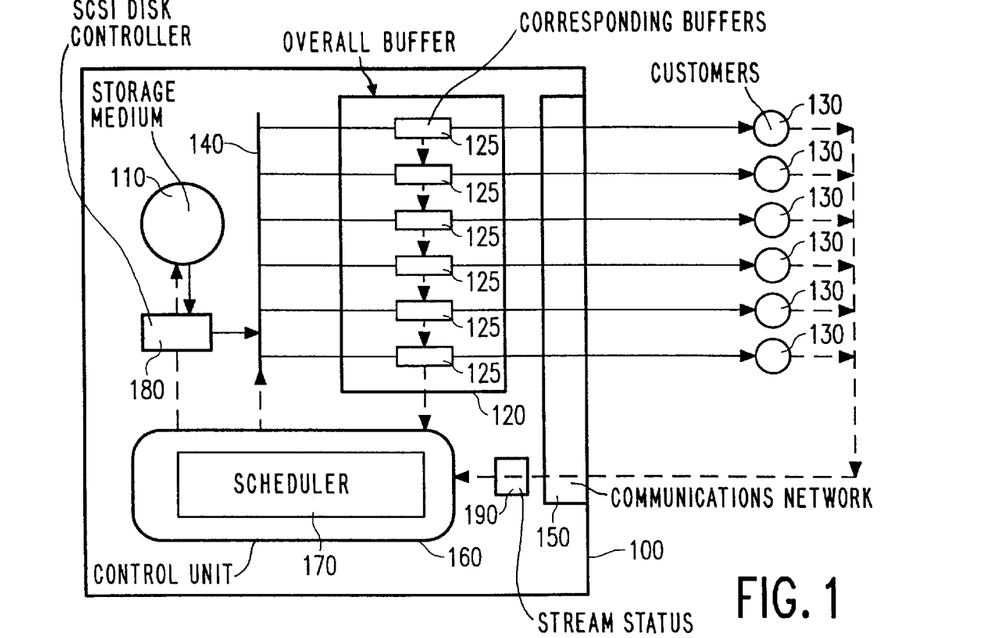
FIG. 1 shows a block diagram of the system according to the invention.

FIG. 1 shows a block diagram of a system 100 according to the invention. An example of such a system 100 is a multimedia server. Multimedia applications can be characterised by an extensive use of audio-visual material. For the playback of audio or video a (near-)continuous supply of audio/video data is required. Known examples of a multimedia server include a near-video-on-demand server and a video-on-demand server. In a near-video-on-demand system the service provider determines when a title is reproduced. A data stream containing the data of the title may be received by many users simultaneously. In a video-on-demand system, typically the user selects a title and controls, with VCR-like controls, the reproduction of the title. The level of interaction is higher and a data stream is typically only consumed by one user. A multimedia server is usually implemented using a file server which is specifically designed to supply continuous data streams. Usually, one or more multimedia titles are stored on a background storage medium 110. At this moment, normally a disk, such as a hard disk, is used as the background storage medium 110, based on its large storage capacity at low cost and the possibility of random access. It will be appreciated that also other storage media, such as optical disks, or even solid state memory may be used. The system 100 comprises a reader 180 for reading data from the storage medium 110. The reader 180 may, for instance, be implemented using a SCSI interface. Advantageously, the storage medium 110 is also included in the system 100. For a disk oriented storage medium 100, data is retrieved as a Disk Access Block (DAB). Depending on the chosen scheduling algorithm, a preference may be given to reading data as fixed size DABs or as variable sized DABs. To be able to store many titles, frequently for the storage medium 110 a disk array is used, for instance in the form of a RAID (Redundant Array of Inexpensive Disks) system. To achieve a high disk bandwidth and at the same time balancing the load of the different disks, so-called striping may be used, where a DAB is divided into smaller blocks, each of which is stored on a different disk of the array. For the purpose of this description, a disk array is also regarded as a disk with a higher bandwidth. Usually DABs which are successively read from disk are not stored contiguously on the disk (e.g. a file is not stored contiguously or the successive DABs belong to different files since they are required for different streams). As a consequence, the disk head needs to be moved and the appropriate starting point of the next DAB has to be awaited. Such a switch takes a considerable time, during which no data can be read. To reduce the switching overhead, the so-called disk sweeping technique is frequently used. In such a scheme, the reader 180 may be able to read a number, of for instance 8 DABs, from the storage medium 110 in one batch. The DABs of the batch are ordered based on their physical track position. For the read operation, the disk head is moved in only one direction (e.g. from the innermost to the outermost position or vice versa), only stopping to read the DABs of the batch. In this way, the switching overhead is reduced significantly. Advantageously, a reader 180 is used which accepts a batch of read requests and internally performs the necessary scheduling of the requested read operations in order to perform the most optimal sweep for the specific disk. The reader 180 may also include a caching memory for temporarily storing data read from the disk before supplying the data, potentially in a different sequence than read from disk, via a bus 140 to the remainder of the system 100.

Particularly for video, a data stream may be very voluminous. To reduce the volume, typically, compression techniques are used. The compression scheme may result in a fixed rate data stream, for instance using MPEG-1 encoding, or a variable rate data stream, for instance using MPEG-2. The system according to the invention assumes that for variable data rate streams a fixed identical maximum consumption rate of $R_{max}$ data elements per second is given, which is used for dimensioning the system (e.g. size of storage and bandwidth of the system) in order to ensure that the system still operates in a worst case situation (e.g. when all data streams consume data at the maximum data rate). Normally, the data is stored in the storage medium 110 and processed by the system 100 in a compressed form. Only at the user 130 the data stream is decoded, using a decoder. Particularly for a variable rate system, the system 100 may also be able to support VCR like control functions. In such a case, a data stream may be in one of a plurality of states including at least an active and a halted state, where an active data stream may supply data to a user and a halted data stream may currently not supply data to a user. Typically, if a user temporarily stops consuming data, the streams stays active. If the user switches stream (e.g. explicitly selects a new title or implicitly is provided with a new stream by, for instance, instructing the system to play in fast forward mode which results in selecting a new stream with the same title being displayed fast), the stream is temporarily halted allowing for new data to be loaded. It will be appreciated the, a slow motion function may be implemented by consuming data at a low rate (the stream remains active) or switching to a new stream (the stream is temporarily halted). The system 100 maintains for the data stream a stream status which indicates the current state. The stream status for one or more data streams is stored in a status memory 190, such as the main memory (RAM) of the server or special registers.

Data is read from the storage medium 100 for only one data stream at a time or, as described above, for a batch of data streams where the data of the batch is supplied as a time multiplexed stream via the bus 140. In all cases, the storage medium 100 is not capable of simultaneously supplying continuous data streams to all users of the system. Instead data for a subset of data streams is read and supplied to the remainder of the system 100 at a higher data rate then consumed by the corresponding data streams. The system 100, therefore, comprises buffers 120 for achieving supply of data at the required rate to the users 130. Usually, the buffers 120 are implemented using RAM. The system 100 further comprises communication means 150 for transferring data of the data streams to users. The communication means 150 may be formed by any suitable means, such as a local area network, for supplying the data to user located near the system 100. In practice, usually a telecommunication network is used for supplying the data over a longer distance.

The system 100 also comprises a control unit 160 for controlling the system 100. A main part of the control unit is formed by the scheduler 170, which determines which DABs should be read by the reader 180 from the storage medium 110 in order to avoid that an underflow or overflow of the buffers 120 occurs. The control unit is typically formed by a processor, such as a RISC-, or CISC-type microprocessor, which is operated under control of a real-time operating system, loaded from a storage medium, such as ROM or a hard disk. The scheduler 170 may be implemented as a software module integrated into the operating system or loaded as an application program. Typically, the scheduler 170 receives status information, such as a filling degree of the buffers, upon which the scheduler 170 bases its decision. For systems which offer VCR-like controls, the scheduler also receives information regarding the status of a stream. In such systems, typically, control information is received from the users 130 via the communication means 150.

The system 100 is dimensioned to be able to support a number of N parallel active data streams, each consuming data at the maximum consumption rate of $R_{max}$ data elements per second, where a data element may for instance be a byte. It is assumed that for all N data streams it is guaranteed that within a given period $t_N$ an amount of data elements can be read from the storage medium 110 to last the given period $t_N$ of consumption at the maximum consumption rate $R_{max}$. It will be appreciated that if all N data streams were serviced successively in one large operation, the duration of such an operation would be significant, leading to large buffering requirements and, since new streams can only be allowed to enter the system in between operations, the response times would be very bad.

In an embodiment according to the invention, in operation the scheduler 170 determines a first group, comprising a subset of the active data streams, and uses the reader 180 to read data for each data stream of the first groups from the storage medium 110 in one sweep. The scheduler 170 ensures that in the overall buffer 120 for each data stream in the system a corresponding buffer 125 is available. The data read by the reader 180 is stored in the respective buffers 125 corresponding to the data streams. The group is limited to a maximum of k data streams. Logically, the total duration $t_N$ is divided into n time slots each with a maximum duration of $t_{interval}$ seconds, where $n*t_{interval}<=t_N<(n+1)*t_{interval}$. As such k corresponds to the maximum number of data streams for which it is guaranteed that within $t_{interval}$ seconds an amount of data elements can be read from the storage medium to last $t_N$ seconds of consumption at the maximum consumption rate $R_{max}$. During n successive time slots, which correspond to n groups, at least K=n*k data streams can be serviced. It will be appreciated that if n is not a divisor of N, K may not be equal to N. This may be compensated by allowing one of the time slots to be longer or shorter, as preferred. For the remainder of the description it is assumed that the maximum number of active data streams allowed in the system is K and that the maximum duration for servicing the K streams in n sweeps is $t_{cycle}=n*t_{interval}$ seconds. In the worst case situation, each of the K data streams is only serviced once during $t_{cycle}$ seconds, implying that each data stream requires at least a buffer for storing $R_{max}*t_{cycle}$ data elements. Since the system according to the invention does not restrict the layout of data on the disk, a data stream may be serviced first during a time slot in a given cycle of n time slots and last in the corresponding time slot of the next cycle. This implies that the buffer for the data stream needs to be able to store at least $R_{max}*t_{interval}$ data elements more, resulting in an accumulated buffer size of at least $R_{max}*(n+1)*t_{interval}$ data elements.

Before each sweep of the first group, the scheduler 170 assigns data streams to the first group. This process of determining the first group and sweeping for the first group is continuously repeated, so that for the purpose of sweeping only a distinction is made between data streams to be swept next, i.e. those streams which have at that instance been assigned to the first group, and data streams which are not going to be swept next, i.e. the remaining data streams. The scheduler 170 ensures that at least those data streams whose corresponding buffer comprises less then $R_{max}*2*t_{interval}$ data elements are assigned to the first group. In this way underflow of buffers during the next $t_{interval}$ seconds is avoided.

Figure 2A:
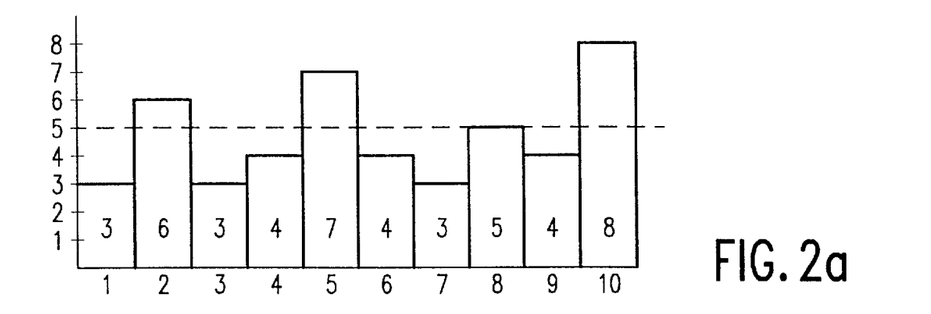
FIGS. 2a and 2b illustrate allocating data streams to preliminary groups.
Figure 2B:
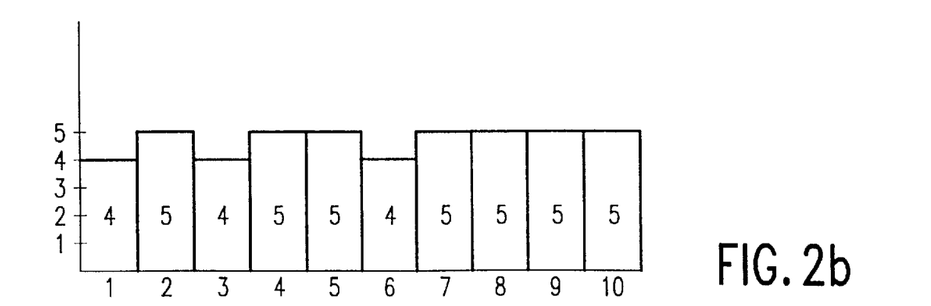

In a further embodiment, advantageously, underflow is avoided for all time intervals. To this end, the scheduler 170 determines the composition of the first group, by initially distributing the data streams over up to n distinct groups, where the groups correspond to the n following time intervals (the first group $g_1$ corresponds to the next time interval; group $g_2$ to the second time interval, etc.). The initial arrangement is based on deciding in which time interval a data stream can be serviced at the latest and assigning the data stream to the corresponding group. As an example, if the buffer of a data stream comprises in between $2*R_{max}*t_{interval}$ and $3*R_{max}*t_{interval}$ data elements, then the data stream is assigned to group $g_2$. As such for each data stream a minimum number i=1 to n is determined such that the buffer corresponding to the data stream comprises less then $R_{max}*(i+1)*t_{interval}$ data elements and the data stream is assigned to group $g_i$. Particularly, for variable rate systems the first groups will tend to include less than average data streams. An example of a possible first distribution is shown in FIG. 2a., where the number of time slots in a cycle (and the number of preliminary groups) is n=10, and the maximum number of streams in a group is k=5. The actual number of active streams at that moment is 47. Horizontally the time slot/group number is shown and vertically the number of streams in the group is shown. In the Figure, groups $g_3$ comprises three data streams and group $g_5$ comprises seven data streams. It will be appreciated that in the example, a problem could occur for the second, fifth and tenth time slots, since the preliminary groups for those time slots comprise more data streams than can be serviced within $t_{interval}$ seconds, being given by k=5. To avoid such a problem, the scheduler 170 reassigns the data streams to the preliminary groups. Advantageously, this is performed by successively checking the preliminary groups starting at the last group $g_n$ (in FIG. 2a the 10th group) to $g_2$ by first verifying whether the data for all data streams of group $g_i$ (i=n to 2) can be read within $t_{interval}$ seconds. If this is not the case (in the example group 10 already gives a problem), repeatedly a data stream of group $g_i$ is selected and removed from group $g_i$ until the data for all remaining data streams of group $g_i$ can be read within $t_{interval}$ seconds. The removed data stream(s) are assigned to an earlier group $g_j$ (=1 to i−1). In a simple implementation, the removed data streams are assigned to one group earlier. In the example, first three data streams are removed from group $g_{10}$ and placed in group $g_9$, bringing the total of group $g_9$ to 7. Next, two streams of $g_9$ are reassigned to $g_8$, bringing the total of $g_8$ to 7. Next, two streams of $g_8$ are reassigned to $g_7$, bringing the total of $g_7$ to 5. As such no problem exists for $g_7$. The next problem occurs for $g_5$, which is solved by reassigning two streams of $g_5$ to $g_4$. Next, one stream is reassigned from $g_4$ to $g_3$. The last problem is solved by reassigning one stream from $g_2$ to $g_1$. FIG. 2b illustrates the assignment of data streams achieved in this way. As will be clear, this is an effective manner of avoiding buffer underflow. It will also be appreciated that the first grouping as shown in FIG. 2a ensures that on average streams with an earliest deadline are serviced first. This results in a high filling degree of the buffers. Preferably, this concept is enhanced even further by, if a group $g_i$ contains too many data streams selecting a data stream with least data left in the buffer corresponding to the data stream to be brought forward. The re-assignment as shown in FIG. 2b ensures that additional space in the system for supporting additional streams is as much as possible immediately available. For reasons of simplicity, in the example of FIG. 2 a simple criterion (the number of streams in a group) is used for determining whether all data streams of a group can be read within $t_{interval}$ seconds. It should further be noted that during the next sweep only data streams of the first group $g_1$ are serviced. For the sweep following that one, the preliminary groups are reestablished and only the first of the then established groups is serviced.

Persons skilled in the art will be able to design suitable alternative schemes for ensuring that no underflow can occur in their specific system. One way of achieving this, is as a default keeping a data stream assigned to the same time slot in the overall cycle of time slots. For variable data rate systems, where a stream may not have consumed at the maximum rate during the previous $t_{cycle}$ seconds, only the required amount of data is read.

In a further embodiment according to the invention, the scheduler 170 checks, before starting a sweep, whether in the first group sufficient capacity is left for servicing at least one more data stream while keeping within an overall sweep duration of at maximum $t_{interval}$ seconds. If so, the scheduler 170 selects a halted data stream for which a re-start signal has been received and assigns the selected data stream to the first group. In the example of FIG. 2, the scheduler 170 can assign one halted stream to the first group. This ensures a short response time for streams which are reactivated, for instance after a user has restarted a stream which was stopped by the user.

In a further or alternative embodiment according to the invention, the scheduler 170 uses available capacity in the first group to include a new stream in the system. Again, in the example of FIG. 2, the scheduler 170 can assign one new stream to the first group. This ensures a short response time for new streams. Obviously, a stream is only included if the system 100 has received a request for including a new data stream. This may, for instance, be a result from a new user accessing the system, an existing user switching to viewing another title or, for some system with VCR-like controls, a viewer changing the playback speed (e.g. from normal to scan forward) which may be implemented by switching to a new stream. It should be noted that in FIG. 2 it seems straightforward that one more stream can be allowed to enter the system in the next sweep. Particularly for variable rate systems, the fact that capacity may be left in the first group may not be a guarantee of sufficient capacity being available in the overall system (for instance, if many streams have not consumed at the maximum rate, the first group may be almost empty, whereas if all active streams consumed at the maximum rate the first group would always be completely filled). Therefore, before allowing a new stream to be included in the first group, the scheduler 170 checks manner whether the entire system can support one more active stream, for instance if the number of streams in the system is less than n*k.

In a further embodiment, the scheduler 170 immediately after a sweep has been completed arranges the next group to be swept and starts the sweep operation. In this way, the successive time intervals are no fixed time slots, but merely act as an upper limit, which guarantees that the system is dimensioned in such a way that a worst case situation can be handled. Various reasons exist for a sweep taking less than the maximum allowed $t_{interval}$ sec., for instance, if the maximum number of streams are not present in the group, the streams did not require the maximum amount of data (typical for a variable rate system), the actual disk times (seek time and rotational latency) were less than the calculated worst case, or the actual disk transfer rate was higher than assumed.

In a further embodiment, the reader 180 reads data from the storage medium 110 in variable size blocks. For a disk-based storage medium a variable size DAB is read which favours the use of a disk storage scheme wherein data is stored as contiguous files or overlapping clusters, to avoid that for reading a DAB the disk needs to be accessed twice. The scheduler 170 determines for the data streams of the first group how much space is left in the corresponding buffers and instructs the reader 180 to read up to that amount of free data elements from the storage medium 110. It will be appreciated that for an operational system only up to $R_{max}*n*t_{interval}$ data elements need to be read for a data stream, whereas the corresponding buffer is capable of storing $R_{max}*(n+1)*t_{interval}$ data elements (to compensate for the possibility of in one cycle being read first in an interval and in a next cycle being read last in the same interval). It will be appreciated that for certain systems it may be preferred to read $R_{max}*t_{interval}$ data elements for a new stream instead of fully filling the buffer.

In a further embodiment, the reader 180 reads data from the storage medium in a predetermined block size. Preferably, the block size corresponds substantially to $R_{max}*t_{cycle}$ data elements. In such a system also a disk wherein data is stored in logically linked clusters at 'random' position of the disk may be used. Preferably, the size of the cluster is a multiple of the predetermined block size (DAB). Like shown in FIG. 2, for such a system the scheduler 170 can simply verify whether the data for all data streams of group $g_i$ (i=n to 2) can be read within $t_{interval}$ seconds by determining the number of data streams assigned to the preliminary group $g_i$. The data for all data streams of group $g_i$ can be read if this number is less than or equal to k.

Figure 3:
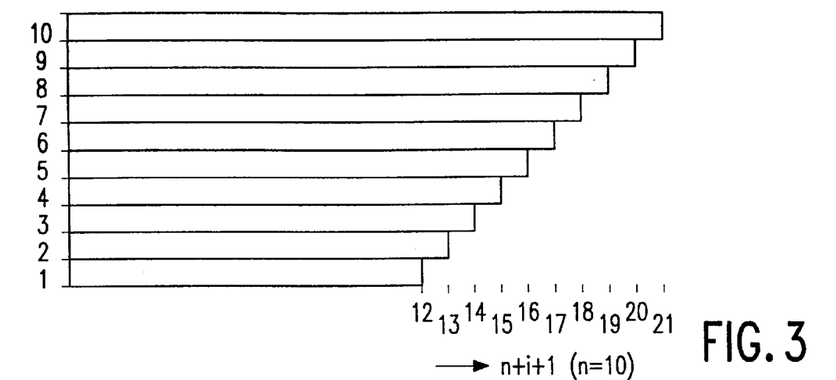
FIG. 3 illustrates allocating buffers of different size to groups of data streams.
Figure 4:
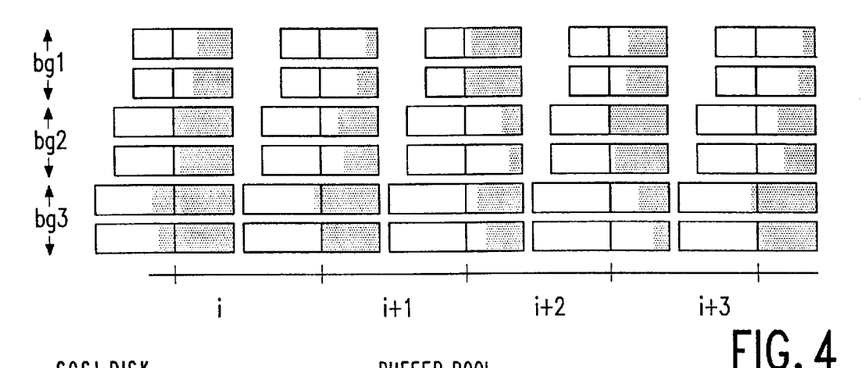
FIG. 4 illustrates the use of buffers of different size.

For variable rate systems the use of a scheme wherein data is read from the storage medium in a fixed block size in principle results in higher buffering requirements. In a worst case scenario for a given cycle of sweeps where the streams were allocated according to the invention to preliminary time intervals, it can occur that most (or even all) streams do not have sufficient space in their buffers for reading an entire block (corresponding to $t_{cycle}$ seconds of data), resulting in the streams being skipped. For the next cycle, almost all streams may have space for a block. It takes $t_{cycle}=n*t_{interval}$ seconds for servicing all streams. Since in such a worst case situation a stream could be serviced first in a given cycle and last in a following cycle, the buffering requirements would increase from $R_{max}*(n+1)*t_{interval}$ data elements for reading variable amounts of data from the storage medium to $R_{max}*(2n)*t_{interval}$ data elements for reading fixed amounts of data from the storage medium. In a further embodiment according to the invention, the scheduler 170 allocates differing amounts of buffer space to data streams. Up to k streams are allocated a buffer for storing $R_{max}*(n+2)*t_{interval}$ data elements; up to a further k streams are allocated a buffer for storing $R_{max}*(n+3)*t_{interval}$ data elements; up to a further k streams are allocated a buffer for storing $R_{max}*(n+4)*t_{interval}$ data elements; etcetera, until finally up to k streams are allocated a buffer for storing $R_{max}*(n+n+1)*t_{interval}$ data elements. This can be described as: for i=1 to n: select a maximum of k data streams from the plurality of data streams and allocate to each selected data stream a corresponding buffer capable of storing $R_{max}*(n+i+1)*t_{interval}$ data elements. This assignment scheme is illustrated in FIG. 3, for a system with a maximum of N=K=50 data streams, where the number of data streams which are treated the same is k=5 and, consequently, n=10. Horizontally, the buffer size is shown. Vertically, the second form of grouping achieved in this way is shown. Each of the second form of groups comprises up to k streams. This second form of grouping in itself does not directly relate to the described mechanism for determining the next group to be swept. The second form of grouping does, however, reduce the choice of when a data stream is serviced, depending on the buffer group of the stream. In a worst case scenario, when during a cycle all streams have been skipped and for the next cycle can be serviced, in the system according to the invention a stream with a buffer for storing $R_{max}*(n+2)*t_{interval}$ data elements will be serviced in the first time interval, whereas a stream with a buffer for storing $R_{max}*(n+n+1)*t_{interval}$ data elements will be serviced in the last time interval of the cycle. An example is illustrated in FIG. 4, wherein a system is shown with a total of six active streams (N=K=6), divided over three buffer groups (n=3) of each two streams (k=2). The filled part of the buffers is shaded. Four successive sweeps (i to i+3) are shown. As an example it is assumed that immediately after the start of sweep i, each data stream has room for a new block (DAB). Since sweep i has already started, no blocks can be read during sweep i for the shown streams. It is further assumed that the streams consume data at the maximum rate $R_{max}$. At the start of sweep i+1 the data streams of the top buffer group (having the smallest buffers), in the example, have least data left (but enough to survive at least one more sweep). Data streams of the other buffer groups have sufficient data for surviving two or more sweeps. As a consequence, in sweep i+1 a DAB is read for each stream of the top buffer group. Similarly, data streams of the second buffer group are served in sweep i+2 and data streams of the third buffer group (shown at the bottom) are served in sweep i+3. It should be noted that streams are not normally serviced in groups which correspond to the buffer group. As illustrated by the example, the buffer groups do provide a fall back position, guaranteeing that all data streams can be served without an underflow occurring in the system.

It will be clear that the buffer assignment to streams results in automatically assigning the corresponding time slots to the streams for the worst case situation. This reduces the average spread in being serviced. As a consequence, the buffering requirements are significantly reduced. It will be appreciated that the given values for the buffer sizes are only a lower limit and that larger buffers may be allocated. Preferably, for new streams entering the system first the largest still available buffer is assigned, assuming that the memory required for the buffers has already been allocated to the system anyhow. This results in a situation where in a not fully loaded system many large buffers are used, resulting in a higher average filling degree and more room for quickly responding to a request for servicing a halted or newly added stream.

Figure 5:
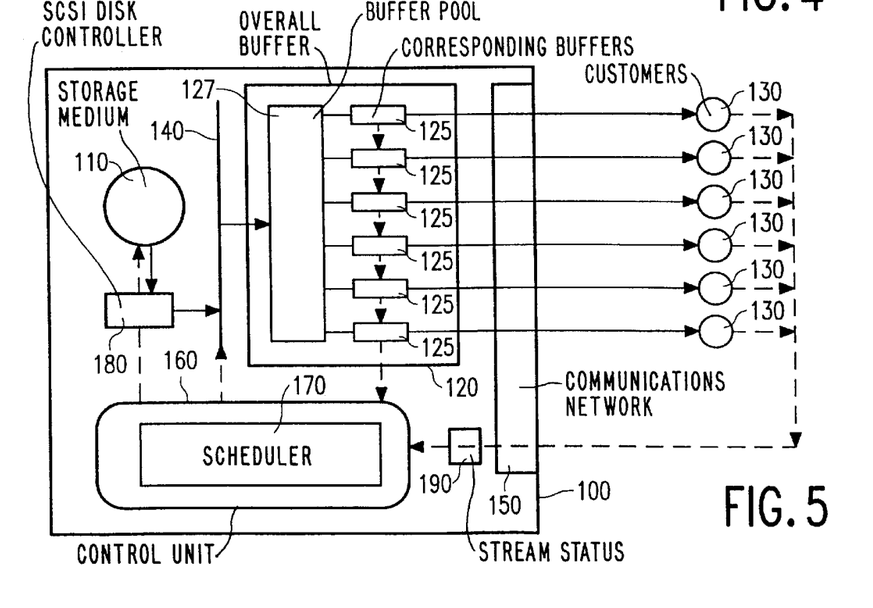
FIG. 5 illustrates the use of a pooled buffer.

In a further embodiment according to the invention, the buffering requirements for a system wherein data is read from the storage medium in a fixed block size are reduced even further by using a buffer pool for the data streams. The scheduler 170 fixedly allocates to each of the data streams a buffer for storing $R_{max}*2*t_{interval}$ data elements. In addition, the scheduler reserves a buffer pool for storing on average for each data stream $R_{max}*n*t_{interval}$ data elements. This results in a minimum size of the buffer pool of $K*R_{max}*n*t_{interval}=K*R_{max}*t_{cycle}$ data elements. FIG. 5 illustrates the use of the buffer pool 127, where the buffers 125 represent the fixed allocated buffers. In order to be able to service each of the data streams of the first group in the next sweep, the scheduler 170 ensures that each of those data streams has a buffer for storing at least $R_{max}*(n+2)*t_{interval}$ data elements by in addition to the two fixedly allocated small blocks assigning n small blocks from the buffer pool, which correspond to a portion of the buffer pool for storing $R_{max}*n*t_{interval}$ data elements. Any known technique for managing shared buffers, such as using linked lists, may be used. If the chosen technique involves a substantial delay, the buffer size may need to be increased for compensating for this. It will be appreciated that the given values for the buffer sizes are only a lower limit and that larger buffers may be allocated.

Without precautions, the situation could occur that halted data streams or data streams consuming at a low rate occupy a considerable part of the pooled buffer, whereas for data streams consuming at a high rate and intended to be swept next not sufficient additional space can be claimed from the buffer for reading a fixed size block (of $R_{max}*n*t_{interval}$ data elements). This would then result in such streams being delayed at least one sweep. Therefore, in a further embodiment according to the invention, the scheduler 170 selects a data stream which is not a member of the first group and de-allocates at least a part of the portion of the buffer allocated to the selected data stream, if the buffer pool does not comprise sufficient unallocated storage space required for allocation to the data streams of the first group. The scheduler may select as many data streams as required. Preferably, a data stream is selected which has most data stored in the allocated portion of the buffer pool. These de-allocation schemes ensure that data streams which most urgently require data (i.e. those streams assigned to in the first group) can be serviced while other streams, such as halted streams, streams consuming at a low rate or streams with a lot of data in the buffer, temporarily get less buffer space (and also don't need it at that moment). Preferably, the scheduler 170 de-allocates portions of the pooled buffer in units of at least the fixed block size of $R_{max}*t_{cycle}$ data elements. In this way it is ensured that for the stream for which data is de-allocated in one of the next sweeps the block read from the storage medium can still match to a cluster on the storage medium, resulting in only one disk access while maintaining freedom in disk layout.

What is claimed is:

1. A method for scheduling reading data from a storage medium for consumption by users in the form of a plurality of data streams, wherein each of the data streams has an identical maximum consumption rate of data elements per second; said method comprising the steps of:

(i) dividing a predetermined period into successive time intervals;

(ii) reserving for each data stream a corresponding buffer capable of storing at least a predetermined number of data elements;

(iii) arranging the data streams in a plurality of preliminary groups by determining, for each data stream, a value such that the buffer corresponding to the data stream comprises less then a predetermined number data elements and assigning the data stream to a group, and reassigning the data streams to the preliminary groups by successively checking the preliminary groups by, verifying whether the data for all data streams of the groups can be read within a predetermined time interval;

if not, repeatedly selecting a data stream of the group and removing the selected data stream from the group until the data for all remaining data streams of the group can be read within the predetermined time interval, and assigning the selected data streams to an earlier group;

(iv) reading data for each data stream of a first one of said groups from the storage medium in one sweep and storing the data in the corresponding buffer; and wherein said method repeats steps (iii) and (iv) in succession and for the repetition reassigning the data streams to the groups by in step (iii) assigning at least data streams whose corresponding buffer comprises less then a predetermined number of data elements to the first group.

2. The method as claimed in claim 1, wherein the preliminary groups are $g_1$ to $g_n$, where $g_1$ corresponds to the first group and the predetermined number of data elements is $R_{max}*(i+1)*t_{interval}$ where value i, i=1 to n, is a minimum number such that the buffer corresponding to a data stream comprises less than the predetermined number of data elements and the predetermined time interval is $t_{interval}$ seconds; and where the buffer is capable of storing at least $R_{max}*(n+1)*t_{interval}$ data elements; and wherein the data stream is assigned to group $g_i$.

3. The method as claimed in claim 2, wherein a data stream in one of a plurality of states includes at least an active and a halted state, where for an active data stream a user may consume data and for a halted data stream a user may currently not consume data; and wherein if in addition to servicing the data streams of the first group in the next sweep sufficient capacity is left for servicing at least one more data stream within an overall sweep duration of at maximum $t_{interval}$ seconds:

(i) selecting a halted data stream for which a re-start signal has been received; and (ii) assigning the selected data stream to the first group.

4. The method as claimed in claim 2, wherein a data stream in one of a plurality of states includes at least an active and a halted state, where for an active data stream a user may consume data and for a halted data stream a user may currently not consume data; and wherein if a predetermined maximum number of data streams which can be serviced has not yet been reached and a request for including a new data stream has been received, in addition to servicing the data streams of the first group in the next sweep, sufficient capacity is left for servicing at least one more data stream within an overall sweep duration of at maximum $t_{interval}$ seconds, (i) selecting a new data stream for which an inclusion request has been received; and (ii) assigning the selected data stream to the first group.

5. The method as claimed in claim 2, wherein step (iv) comprises determining for a data stream of the first group an amount of free data elements in the buffer corresponding to the data stream and reading up to said amount of free data elements from the storage medium.

6. The method as claimed in claim 2, wherein said step of selecting a data stream of group $g_i$ comprises selecting a data stream with least data left in the buffer corresponding to the data stream.

7. The method as claimed in claim 2, wherein during each sweep for each data stream of the first group data is read from the storage medium in a predetermined block size, which substantially corresponds to $R_{max}*t_{cycle}$ data elements, wherein the step of verifying whether the data for all data streams of group $g_i$ (i=n to 2) can be read within $t_{interval}$ seconds comprises determining the number of data streams assigned to the preliminary group $g_i$ and deciding that the data for all data streams of group $g_i$ can be read if less than or equal to k data streams have been assigned to the preliminary group $g_i$, where k corresponds to the maximum number of data streams for which it is guaranteed that within $t_{interval}$ seconds an amount of data elements can be read from the storage medium to last $t_{cycle}$ seconds of consumption at the maximum consumption rate $R_{max}$.

8. The method as claimed in claim 7, wherein step (ii) comprises for i=1 to n, selecting a maximum of k data streams from the plurality of data streams and allocating to each selected data stream a corresponding buffer capable of storing at least $R_{max}*(n+i+1)*t_{interval}$ data elements.

9. The method as claimed in claim 7, wherein step (ii) comprises:

reserving a buffer pool for storing at least $K*R_{max}*t_{cycle}$ data elements, where K corresponds to the maximum number of data streams for which it is guaranteed that within $t_{cycle}$ an amount of data elements can be read from the storage medium to last $t_{cycle}$ seconds of consumption at the maximum consumption rate $R_{max}$;

fixedly allocating to each of the data streams a buffer for storing at least $R_{max}*2*t_{interval}$ data elements; and dynamically allocating to each of the data streams of the first group a portion of the buffer pool for storing at least $R_{max}*n*t_{interval}$ data elements.

10. The method as claimed in claim 9, wherein the method comprises selecting at least one data stream which is not a member of the first group and de-allocating at least a part of the portion of the buffer allocated to the selected data stream, if the buffer pool does not comprise sufficient unallocated storage space required for allocation to the data streams of the first group.

11. The method as claimed in claim 10, wherein selecting a data stream for de-allocation comprises selecting a data stream which has most data stored in the allocated portion of the buffer pool.

12. The method as claimed in claim 10, wherein the de-allocation occurs in units of at least $R_{max}*t_{cycle}$ data elements.

13. The system for reading data from a storage medium and supplying the data in the form of a plurality of data streams for consumption to users, wherein each of the data streams has an identical maximum consumption rate of data elements per second, said system comprising:

a plurality of buffers for storing data;

a reader for reading data from the storage medium and storing the read data in at least one of the buffers; and a scheduler for controlling the reader by:
(i) dividing a predetermined period into successive time intervals;
(ii) reserving for each data stream a corresponding buffer capable of storing at least a predetermined number of data elements,
(iii) arranging the data streams in a plurality of preliminary groups by determining, for each data stream, a value such that the buffer corresponding to the data stream comprises less then a predetermined number of data elements and assigning the data stream to a group; and reassigning the data streams to the preliminary groups by successively checking the preliminary groups by, verifying whether the data for all data streams of the groups can be read within a predetermined interval, if not: repeatedly selecting a data stream of groups and removing the selected data stream from the group until the data for all remaining data streams of the group can be read within the predetermined interval, and assigning the selected data streams to an earlier group; and (iv) causing the reader to read data for each data stream of a first one of said groups from the storage medium in one sweep and to store the data in the corresponding buffer;

wherein the scheduler is conceived to repeats steps (iii) and (iv) in succession and for the repetition reassigning the data streams to the groups by in step (iii) assigning at least data streams whose corresponding buffer comprises less then a predetermined number of data elements to the first group.

14. The system as claimed in claim 13, wherein the preliminary groups $g_1$ to $g_n$, where $g_1$ corresponds to the first group and the predetermined number of data elements is $R_{max}*(i+1)*t_{interval}$ where value i, i=1 to n, is a minimum number such that the buffer corresponding to the data stream comprises less than the predetermined number of data elements and the predetermined time interval is $t_{interval}$ seconds; and wherein the data stream is assigned to group $q_i$.

15. The system as claimed in claim 14, wherein the system comprises a status memory for storing for at least one data stream a stream status, said stream status indicating one of a plurality of states including at least an active and a halted state, where for an active data stream a user may consume data and for a halted data stream a user may currently not consume data; and wherein the scheduler is conceived to, if in addition to servicing the data streams of the first group in the next sweep sufficient capacity is left for servicing at least one more data stream within an overall sweep duration of at maximum $t_{interval}$ seconds, (i) selecting a halted data stream for which a re-start signal has been received; and
(ii) assigning the selected data stream to the first group.

16. The system as claimed in claim 14, wherein the system comprises a status memory for storing for at least one data stream a stream status, said stream status indicating one of a plurality of states including at least an active and a halted state, where for an active data stream a user may consume data and for a halted data stream a user may currently not consume data; and wherein the scheduler is conceived to, if a predetermined maximum number of data streams which can be serviced has not yet been reached and a request for including a new data stream has been received, in addition to servicing the data streams of the first group in the next sweep, sufficient capacity is left for servicing at least one more data stream within an overall sweep duration of at maximum $t_{interval}$ seconds:

selecting a new data stream for which an inclusion request has been received; and assigning the selected data stream to the first group.

17. The system as claimed in claim 14, wherein step (iv) comprises determining for a data stream of the first group an amount of free data elements in the buffer corresponding to the data stream and reading up to said amount of free data elements from the storage medium.

18. The system as claimed in claim 14, wherein the reader is conceived to during each sweep for each data stream of the first group read data from the storage medium in a predetermined block size, which substantially corresponds to $R_{max}*t_{cycle}$ data elements, wherein the scheduler is conceived to verifying whether the data for all data streams of group $g_i$ (i=n to 2) can be read within $t_{interval}$ seconds by determining the number of data streams assigned to the preliminary group $g_i$ and deciding that the data for all data streams of group $g_i$ can be read if less than or equal to k data streams have been assigned to the preliminary group $g_i$, where k corresponds to the maximum number of data streams for which it is guaranteed that within $t_{interval}$ seconds an amount of data elements can be read from the storage medium to last $t_{cycle}$ seconds of consumption at the maximum consumption rate $R_{max}$.

19. The system as claimed in claim 18, wherein step (ii) comprises for i=1 to n, selecting a maximum of k data streams from the plurality of data streams and allocating to each selected data stream a corresponding buffer capable of storing at least $R_{max}*(n+i+1)*t_{interval}$ data elements.

20. The system as claimed in claim 18, wherein step (ii) comprises:

reserving a buffer pool for storing at least $K*R_{max}*t_{cycle}$ data elements, where K corresponds to the maximum number of data streams for which it is guaranteed that within $t_{cycle}$ an amount of data elements can be read from the storage medium to last $t_{cycle}$ seconds of consumption at the maximum consumption rate $R_{max}$;

fixedly allocating to each of the data streams a buffer for storing at least $R_{max}*2*t_{interval}$ data elements; and dynamically allocating to each of the data streams of the first group a portion of the buffer pool for storing at least $R_{max}*n*t_{interval}$ data elements.

21. The system as claimed in claim 13, wherein the system includes the storage medium.

* * * * *